United States Patent
Bai et al.

(10) Patent No.: US 10,829,915 B2
(45) Date of Patent: Nov. 10, 2020

(54) PANEL ASSEMBLY AND A TAP DEVICE WITH THE PANEL ASSEMBLY

(71) Applicants: Shuanglin Bai, Fujian (CN); Liming Ye, Fujian (CN); Jianping Zhou, Fujian (CN)

(72) Inventors: Shuanglin Bai, Fujian (CN); Liming Ye, Fujian (CN); Jianping Zhou, Fujian (CN)

(73) Assignee: XIAMEN LOTA INTERNATIONAL CO., LTD., Fujian (CN)

(*) Notice: Subject to any disclaimer, the term of this patent is extended or adjusted under 35 U.S.C. 154(b) by 27 days.

(21) Appl. No.: 16/229,756

(22) Filed: Dec. 21, 2018

(65) Prior Publication Data

US 2020/0048881 A1    Feb. 13, 2020

(30) Foreign Application Priority Data

Aug. 9, 2018  (CN) .......................... 2018 1 0902847

(51) Int. Cl.
  *E03C 1/04*  (2006.01)
  *E03B 7/07*  (2006.01)
  *F16K 1/36*  (2006.01)

(52) U.S. Cl.
  CPC .............. *E03C 1/0404* (2013.01); *E03B 7/07* (2013.01); *F16K 1/36* (2013.01)

(58) Field of Classification Search
  CPC ........ E03C 1/04; E03C 1/0401; E03C 1/0402; E03C 1/0403; E03C 1/0404
  USPC ...................................... 4/675–678
  See application file for complete search history.

(56) References Cited

U.S. PATENT DOCUMENTS

| 6,718,569 | B2* | 4/2004 | Burger | .................... E03C 1/023 137/270 |
| 7,191,476 | B1* | 3/2007 | Ko | ........................ E03C 1/0408 4/675 |
| 2012/0151669 | A1* | 6/2012 | Wilson | .................... E03C 1/025 4/615 |
| 2019/0242776 | A1* | 8/2019 | Chang | ................. F16K 37/0075 |
| 2020/0040557 | A1* | 2/2020 | Johnson | ............. F16K 11/0445 |

* cited by examiner

*Primary Examiner* — Huyen D Le
(74) *Attorney, Agent, or Firm* — Morgan, Lewis & Bockius LLP (57) ABSTRACT

The invention refers to a panel assembly and a tap device including the panel assembly, wherein the tap device includes a valve with a valve cover, and the panel assembly includes a panel with a through hole, wherein the panel assembly further includes a positioning member passing through the through hole and can be secured to the panel, and the positioning member is movably plugged onto the valve cover in the axial direction of the valve cover.

10 Claims, 11 Drawing Sheets

PANEL ASSEMBLY AND A TAP DEVICE WITH THE PANEL ASSEMBLY

RELATED APPLICATION

This application claims the benefit of and priority to Chinese Patent Application No. 201810902847.7, filed Aug. 9, 2018, the entire disclosure of which is hereby incorporated by reference.

FIELD

The invention relates to a bath device, and in particular to a panel assembly and a tap device with the panel assembly.

BACKGROUND

Usually, the combination of a valve, a decorative panel and a handle and the like are used as the control device of a tap in bath devices. Generally speaking, the valve is installed onto the bodies of conduits embedded in walls, and the decorative panel is secured to the conduits by means of two long screws. Further, a decorative sleeve is need which is plugged onto the valve and passed through a through-hole of the decorative panel. The handle is configured to be connected to a valve rod at the side of the decoration panel that is opposite to the wall. The two screws and the decorative sleeve will be exposed at the side of the decorative panel that is opposite to the wall after assembling.

Some issues occurred in the installment of instant decorative panel. For example, the long screws and the decorative sleeve need to be electroplated, which will increase the cost of elements and lead to environment entertainment. Furthermore, the exposed screws and the decorative sleeves protruding out of the decorative panel due to the different mounting depths caused by the walls with different depths will affect the appearance. In addition, securing the decorative panel by means of two long screws will easily lead to the force applied to the panel uneven, and thus the bodies of the conduits in walls or the axial rod engaged with the handle will tilt, which will influence the service life and the user experience. Additionally, the axial rod protrudes out of the wall in a hanging manner and engages with the handle without being protected by supporting members, resulting in shaking thereof and thus cracking readily.

SUMMARY

An object of the present invention is to provide a panel assembly that will give solutions to some of the problems mentioned above.

Another object of the present invention is to provide a tap device which makes use of the improved panel assembly mentioned above.

According to one aspect of the disclosure, a panel assembly for a tap device is provided, wherein the tap device includes a valve with a valve cover, and the panel assembly includes a panel with a through hole, wherein the panel assembly further includes a positioning member passing through the through hole and can be secured to the panel, wherein the positioning member is movably plugged onto the valve cover in an axial direction of the valve cover.

In a specific embodiment, the positioning member defines a recess in a circumferential direction thereof, in which a periphery of the through hole of the panel is received.

In a specific embodiment, the positioning member comprises: a first section adapted to be plugged onto the valve covers movably, with an outer diameter of the end face thereof being larger than a diameter of the through hole of the panel; and a second section connected to the first section and having a stop face projecting radially, wherein the stop face is spaced apart from the end face of the first section in an axial direction of the first section, and the recess for receiving the panel is defined between the stop face and the end face of the first section.

In a specific embodiment, the first section is configured as a sleeve with an internal thread, so as to be adapted to form a threaded connection with the valve cover.

In a specific embodiment, the second section is provided with an external thread matched to the internal thread of the first section, such that the first section and the second section are detachable.

In a specific embodiment, the second section is provided with a flange extending in a circumferential direction thereof, and an end face of the flange facing the external thread defines the stop face.

In a specific embodiment, the first section and the second section are integrally formed, the second section is arranged along a circumferential direction thereof with a plurality of radially retractable elastic claws, and end faces of the plurality of elastic claws facing the first section define the stop face.

In a specific embodiment, the valve further includes a valve core provided with a valve rod and received in the valve cover, and the tap device further includes a handle adapted to be connected to the valve rod, wherein the end face of the second section of the positioning member facing away from the first section defines a positioning slot adapted to receive the handle.

According to another aspect of the disclosure, a tap device is provided, comprising: a body having a mounting slot; a valve having a valve core received in the mounting slot and provided with a valve rod, as well as a valve cover plugged onto the valve core and connected to the body; a panel assembly plugged onto the valve cover; and a handle connected to the valve rod on a side of the panel assembly facing away from the body; wherein the panel assembly is the panel assembly mentioned above.

According to another aspect of the disclosure, a tap device is provided, comprising: a body having a mounting slot; a valve having a valve core received in the mounting slot and provided with a valve rod, as well as a valve cover plugged onto the valve core and connected to the body; a panel assembly plugged onto the valve cover; and a handle connected to the valve rod on a side of the panel assembly facing away from the body; wherein the panel assembly is the panel assembly mentioned above, the handle has an inner circumferential wall and an outer circumferential wall radially spaced therefrom, and wherein the inner circumferential wall is disposed in the positioning slot and defines an inner hole extending axially, and the valve rod is inserted into the inner hole and connected to the inner circumferential wall.

In a specific embodiment, a spacer is mounted on the inner circumferential wall of the handle and disposed into the positioning slot together with the inner circumferential wall, wherein the spacer is positioned between the positioning slot and the inner circumferential wall.

A part of the features and the advantages of the invention will be apparent to the skilled in the art after reading this disclosure, while another part thereof will be described in the following detailed description combined with the drawings.

BRIEF DESCRIPTION OF DRAWINGS

Hereinafter, the embodiments of the present invention will be described in detail in combination with drawings, in which.

REFERENCE NUMBER LIST 1. body
11. mounting slot
2. valve
21. valve cover
211. external thread
22. valve core
23. valve rod
3. panel assembly
31. panel
311. through hole
32, 32'. positioning member
33. collar
34,34'. the first section
341. end face
342. internal thread
343. annular flange
36,36'. the second section
361. external thread
362. stop face
363. claw
364. positioning slot
38. recess
4. handle
41. body
411. inner circumferential wall
412. outer circumferential wall
413. inner hole
42. handle
43. spacer
5. lock screw
6. wall surface

DETAILED DESCRIPTION

Now referring to the drawings, in which the schematic embodiments of the device disclosed in the present invention will be described in detail. The drawings are not necessary to be drawn in scale in accordance with the sizes of detailed embodiments, and some features can be amplified, removed or cut off to show and explain the contents of the disclose better, in spite of some drawings being provided to illustrate some embodiments of the invention. The positions of some members in the drawings can be adjusted as desired without affecting the results. The phrases "in the drawings" or the like appearing in the description may not refer to all the drawings or embodiments.

Some directional items used to describe the drawings hereafter, such as "inner", "outer", "upper", "lower" and the like, will be understood as having the normal meaning thereof and indicating directions as involved when the drawings are viewed normally. The directional items described here are normal directions that would be appreciated by the skilled in the art substantially unless indicated otherwise.

The terms "the first". "the first one", "the second", "the second one" and the like used in the disclosure do not represent any order, quantity or importance, just to distinguish one element from others.

Figure 1:
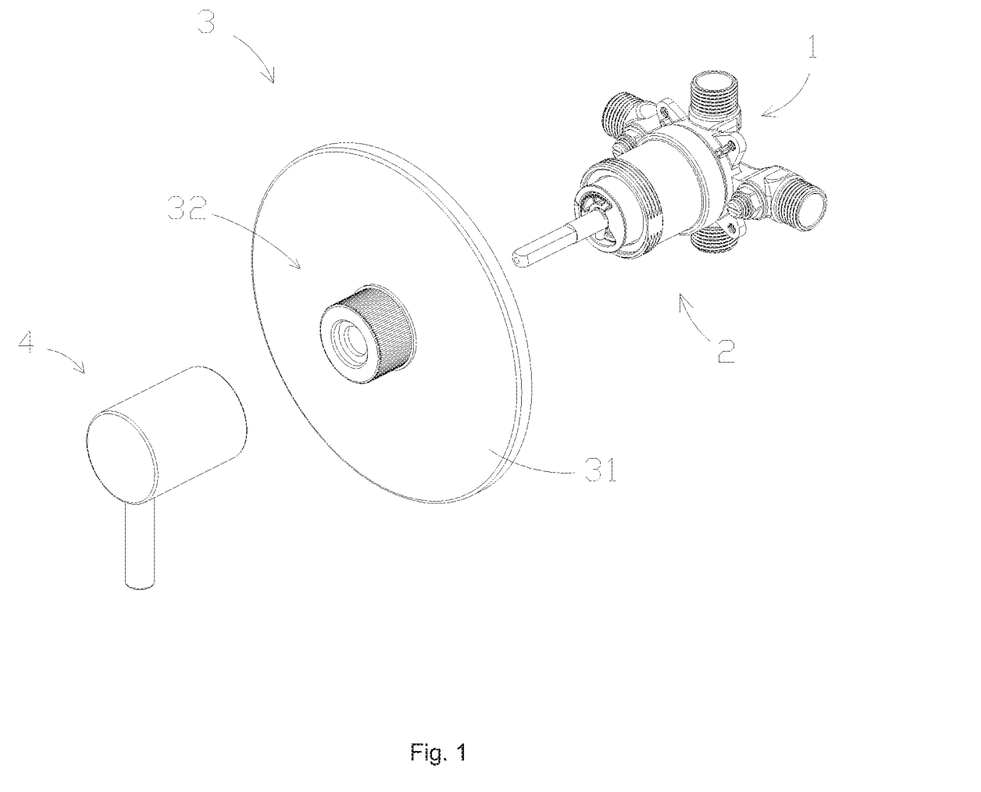
FIG. 1 is a schematic view of the tap device according to an embodiment of the invention, wherein the handle, the panel assembly and the body with a valve are shown separately.
Figure 2:
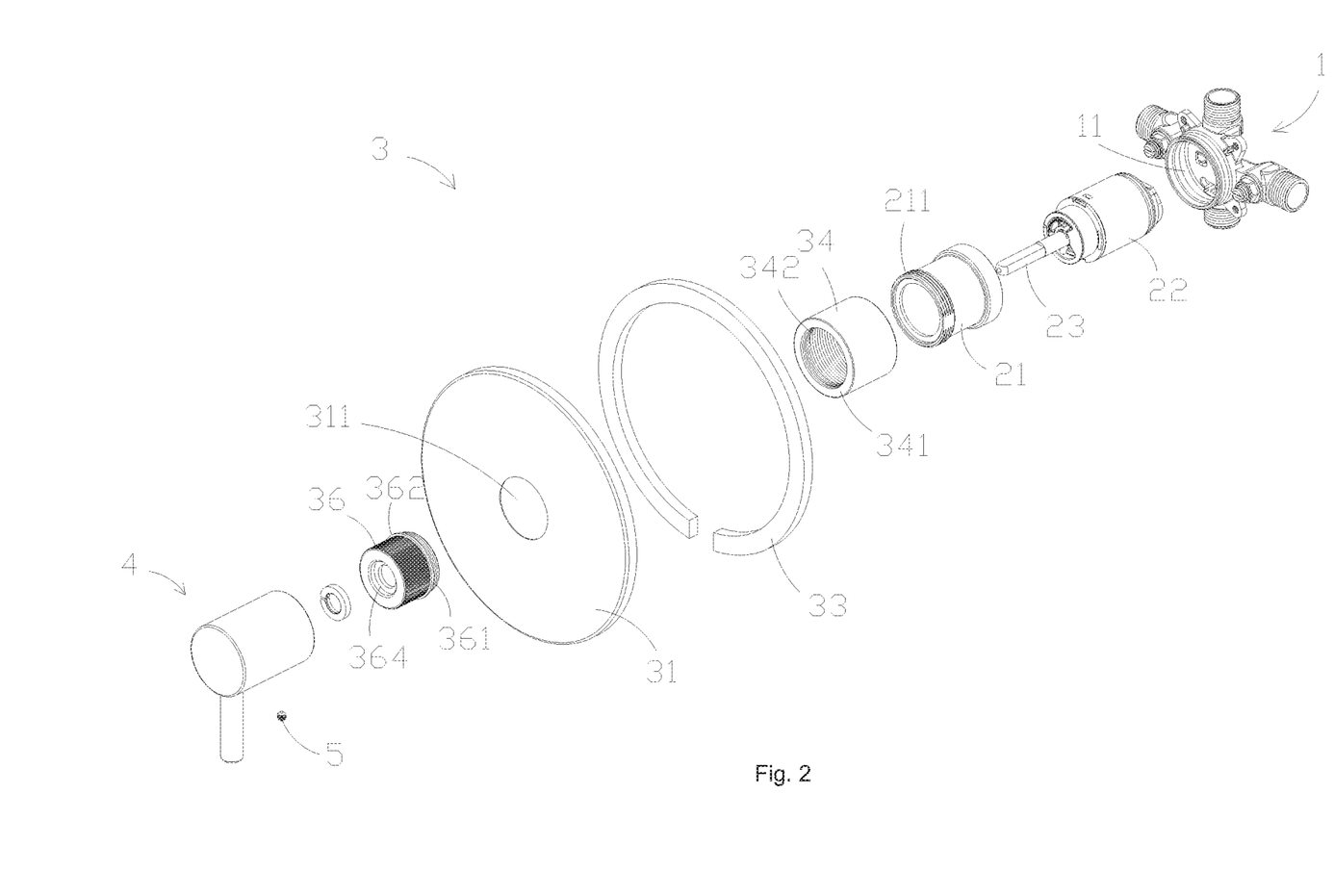
FIG. 2 is an exploded schematic view of the tap device according to an embodiment of the invention.

FIG. 1 and FIG. 2 show an embodiment of the tap device, which includes a body 1, a valve 2, a panel assembly 3 and a handle 4. The body 1 comprises a plurality of inlet conduits and outlet conduits communicating with each other, and a mounting slot 11 configured to be communicated with these inlet and outlet conduits. The valve 2 comprise a valve core 22 arranged in the mounting slot 11 of the body 1, a valve cover 21 configured to be plugged onto the valve core 22 and secured to the body 1, and a valve rod 23 protruding from the valve core 22 and passing through the valve cover 21. Preferably, the valve cover 21 is provided with internal threads at an end close to the body 1, and the body 1 is provided with external threads surrounding the mounting slot 11, such that the valve cover 21 is secured to the body 1 by means of the threads, and the valve core 22 can be pressed against the mounting slot 11 steadily. In this regard, any known constructions can be selected for the valve core 22 and the valve rod 23.

Figure 3:
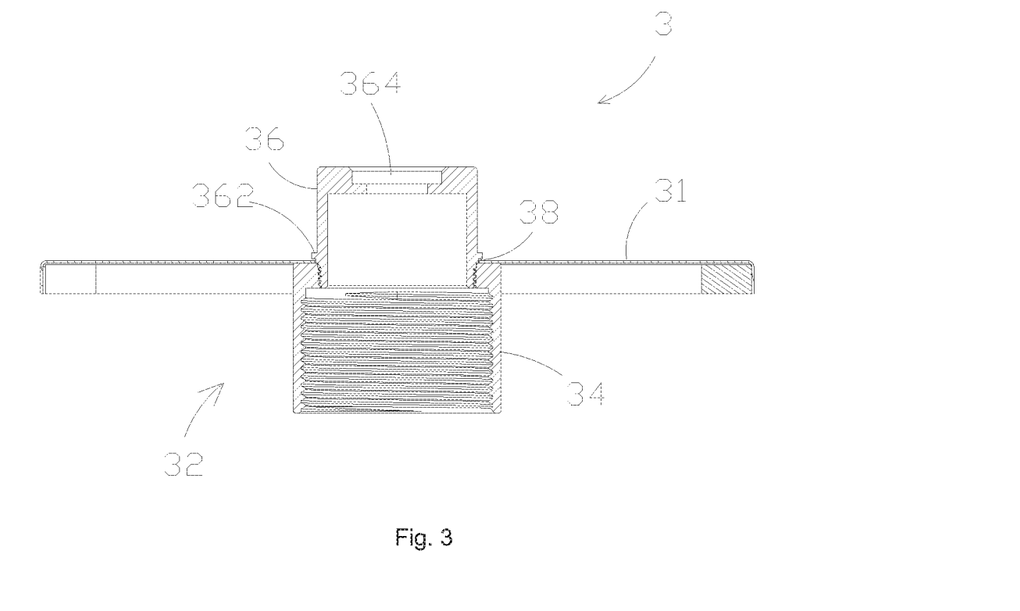
FIG. 3 is a sectional view of the panel assembly according to an embodiment of the invention.
Figure 5:
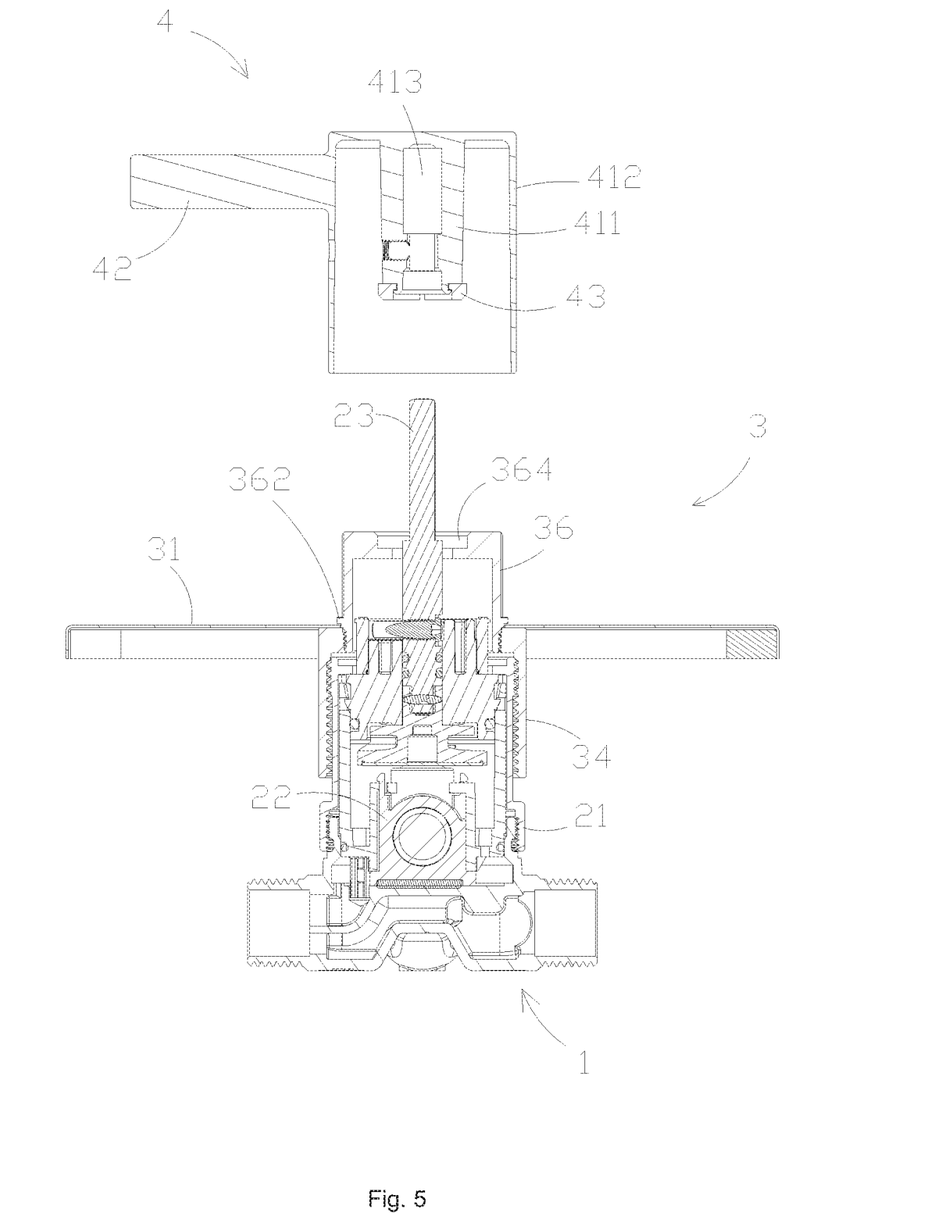
FIG. 5 is a sectional view of the tap device according to an embodiment of the invention.

With reference to FIG. 3 and FIG. 5, the panel assembly 3 is plugged onto the valve cover 21, and the valve rod 23 passes through and protrudes from the panel assembly 3 to engage with the handle 4.

In the illustrated embodiment, the panel assembly 3 includes a panel 31 for example having a circular shape and a through hole 311, and a positioning member 32 passing through the through hole 311 and connecting with the panel 31. In this embodiment, the positioning member 32 is in form of split type and comprises a first section 34 and a second section 36 which are detachably coupled. The end face 341 of the first section 34 facing away from the body 1 and the side of the panel 31 facing the body 1 are positioned face to face, and the diameter of the end face 341 is larger than that of the through hole 311, such that an axial stop fit is formed between the end face 341 and the panel 31. The second section 36 is inserted into the first section 34 from the side of the panel 31 facing away from the body 1 through the through hole 311 and secured with respect to the first section 34. A recess 38 extending circumferentially is formed between the first section 34 and the second section 36 after the first and the second sections 34, 36 are assembled together, and the periphery of the through hole 311 of the panel 31 is received in the recess 38. Preferably, a circumferential flange 362 that projects radially is provided at the end of the second section 36, with the outer diameter of the circumferential flange 362 being larger than that of the through hole 311. The circumferential flange 362 is axially spaced from the end face 341 of the first section 34 to form the recess 38 therebetween, and the side of the circumferential flange 362 facing the panel 31 acts as stop face which prevents the panel 31 moving axially.

In contrast to the connection that cannot be separated substantially, such as by means of melting with each other, integrated molding and adhesion, etc., the "detachable connection" and the "spillable connection" as used herein refer to connections that can be detached without destroying its first part and the second part substantially. The first section 34 can be connected to the second section 36 detachably by means of any suitable ways, for example by means of providing the first section 34 with internal threads 342 and the second section 36 with external threads 361 configured to be mated with the internal threads 342. Other detachable connections can be used such as snap connection and interference fitting etc. When assembly is completed, the positioning member 32 can be rotated with respect to the panel 31 or not, and the panel 31 is tightly pressed against the wall by the positioning member 32.

As shown in FIG. 5, the first section 34 is plugged onto the valve cover 21 and can be moved along the axis with respect to the valve cover 21 and fixed with respect to the valve cover 21 after being moved to a proper position, so that the position of the panel assembly 3 as a whole relative to the body 1/valve 2 can be adjusted according to the depths of the wall. This can be achieved, for example, by providing an external thread 211 at one end of the valve cover 21 far away from the body 1 and a matched internal thread on the first section 34 such that the first section 34 can be threaded into engagement with the valve cover 21. As the first section 34 in the example will also be engaged with the second section 36 by means of threads, the internal threads of the first section 34 here on its inner wall can be uniform along the axial direction thereof to match the external threads of the valve cover 21 and the second section 36 at the same time.

The threaded connection is merely an exemplary representation of the configuration required to effect relative movement and positioning of the first section and the valve cover, and those skilled in the art will appreciate other suitable variations to achieve both of the relative motion and positioning. In an embodiment not shown, for example, the valve cover 21 can be provided with a sliding groove extending axially and a plurality of positioning notches which are arranged along and communicate respectively with the sliding groove, while the first section 34 is provided with a projection that can be inserted into and moved along the sliding groove. The projection of the first section 34 will be moved along the sliding groove firstly during assembling, and then slide or engage into a suitable positioning notch by rotating the first section 34 when it reaches a proper position.

Figure 6:
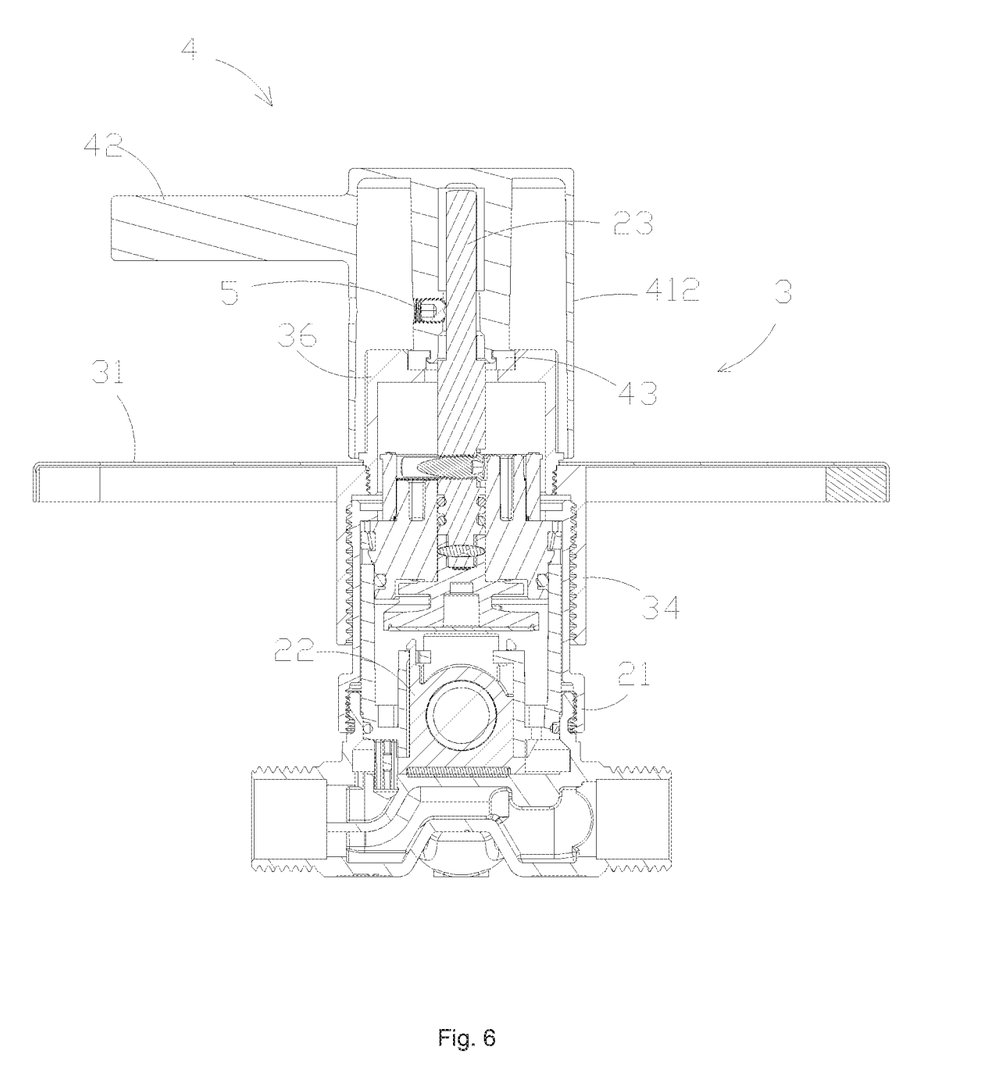
FIG. 6 is a sectional view of the tap device according to an embodiment of the invention, wherein the tap device is arranged in a relatively shallow wall.
Figure 7:
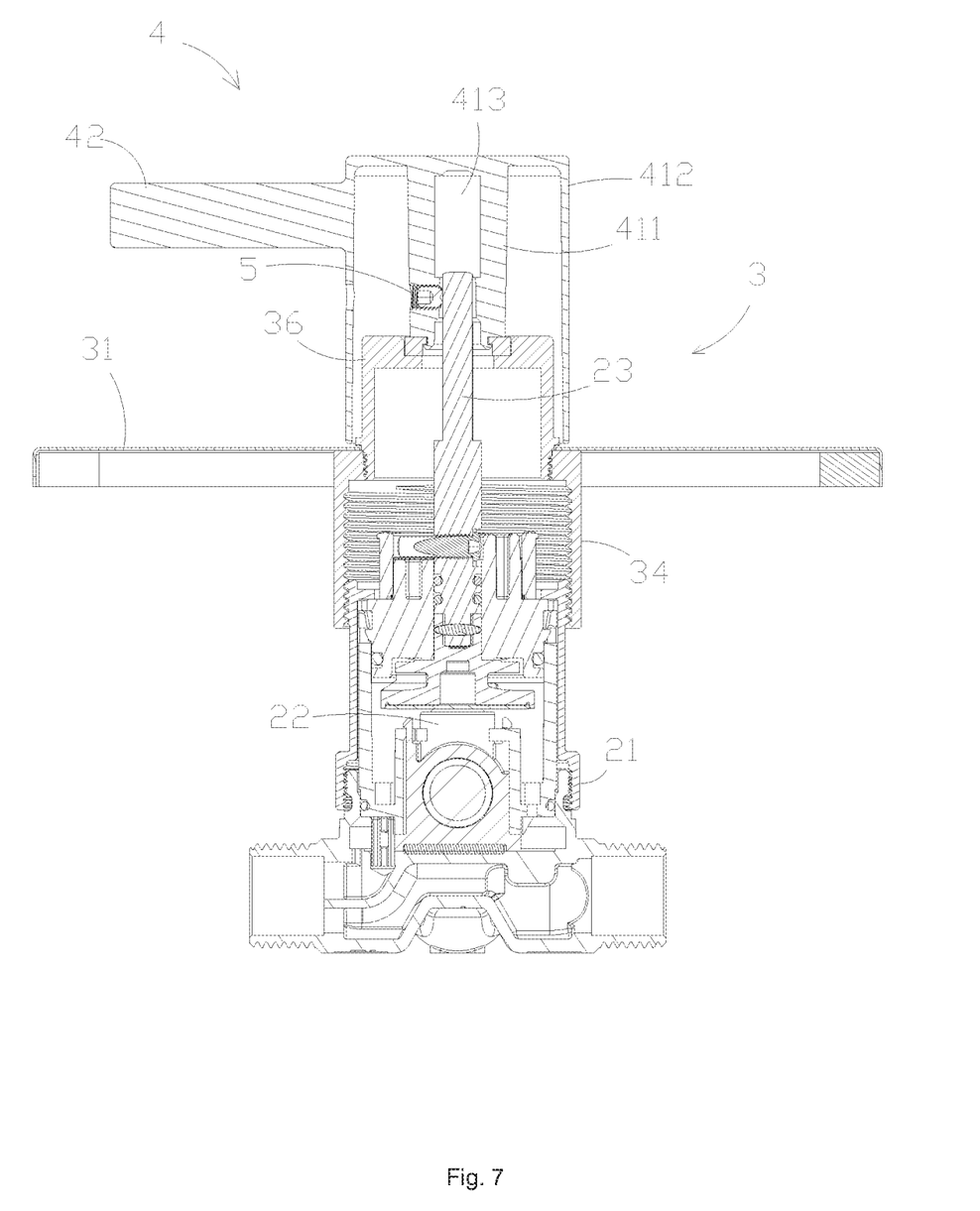
FIG. 7 is a sectional view of the tap device according to an embodiment of the invention, wherein the tap device is arranged in a relatively deep wall.

Referring to the FIG. 6 and FIG. 7, such walls with different mounting depths can be matched with the panel on its surface, simply by adjusting the axial relative position of the first section 34 with respect to the valve cover 21, without worrying about the panel assembly which projects out of the wall excessively. For example, as shown in FIG. 6, as for a wall with a shallower mounting depth, the first section 34 is rotated towards the body 1 to decrease the distance between them, which facilitates the second section 36 to press the panel 31 against the surface of the wall. However, as for a wall with a deeper mounting depth, as shown in FIG. 7, the first section 34 is rotated towards a direction away from the body 1 to increase the distance between them, and thus the panel 31 can be adaptive to the position of the surface of the wall, which facilitates the second section 36 to press the panel 31 against the surface of the wall.

Figure 8:
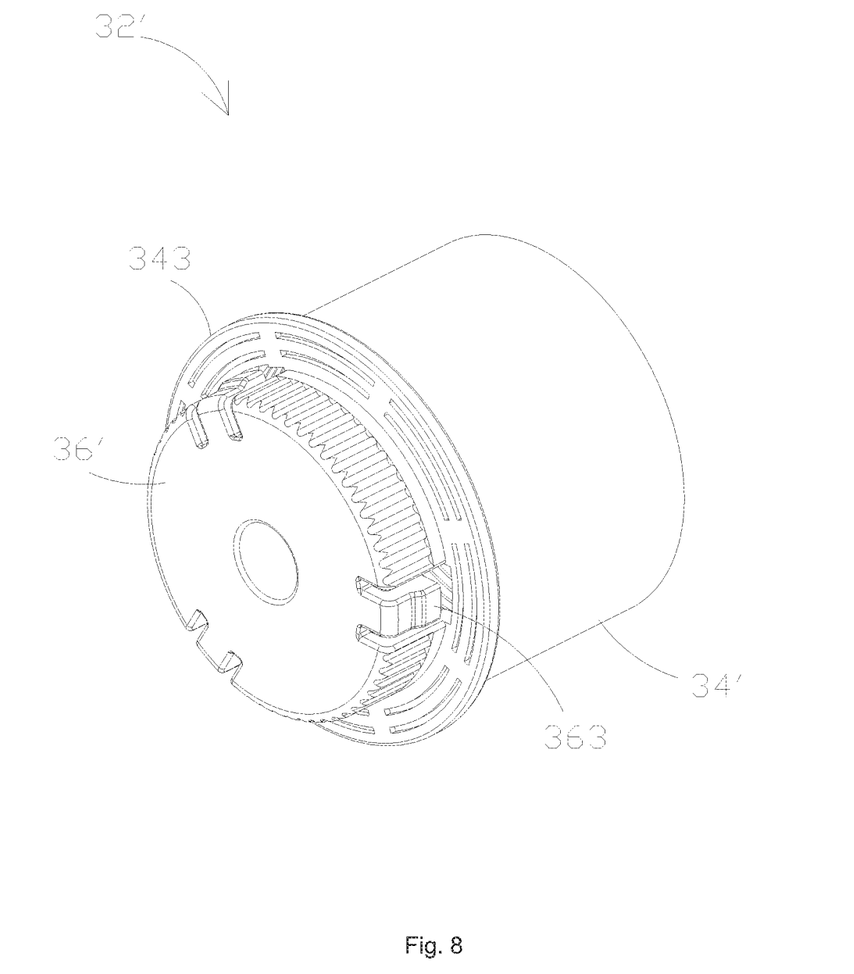
FIG. 8 is a schematic view of another positioning member according to an embodiment of the invention.

FIG. 8 shows another embodiment of the positioning member. The positioning member 32' is an one-piece member, i.e. the first section 34' and the second section 36' are non-detachable. The first section 34' is provided with internal threads for engaging with external threads 211 of the valve cover 21 to adjust the axial position of the positioning member 32' together with the panel 31 relatively to the valve cover 21. The end of first section 34' facing away from the body 1 forms an annular flange 343 that projects radially, and the diameter of the end face of the annular flange 343 is larger than that of the through hole 311 of the panel 31. The second section 36' is arranged along its circumferential direction with a plurality of claws 363 which can be radially retracted after being forced to pass through the through hole 311 of the panel 31, and can radially rebound after the force is released to form an axial stop fitting with the panel 31. A recess is formed between the claws 363 and the annular flange 343. The panel 31 is plugged onto the second section 36' from the side facing away from the first section 34' and then goes over the claws 363, the periphery of the through hole 311 is received in the recess formed between the claws 363 and the annular flange 343 of the first section 34' and the side of the claws 363 facing the first section 34' acts as stop face that prevents the panel 31 from moving axially. It should be noted that, all the detailed construction of the detachable positioning member 32, for example a positioning slot 364 for cooperating with the handle 4 which will be discussed below, can be applied to the one-piece positioning member 32' without introducing contradictions.

Figure 4:
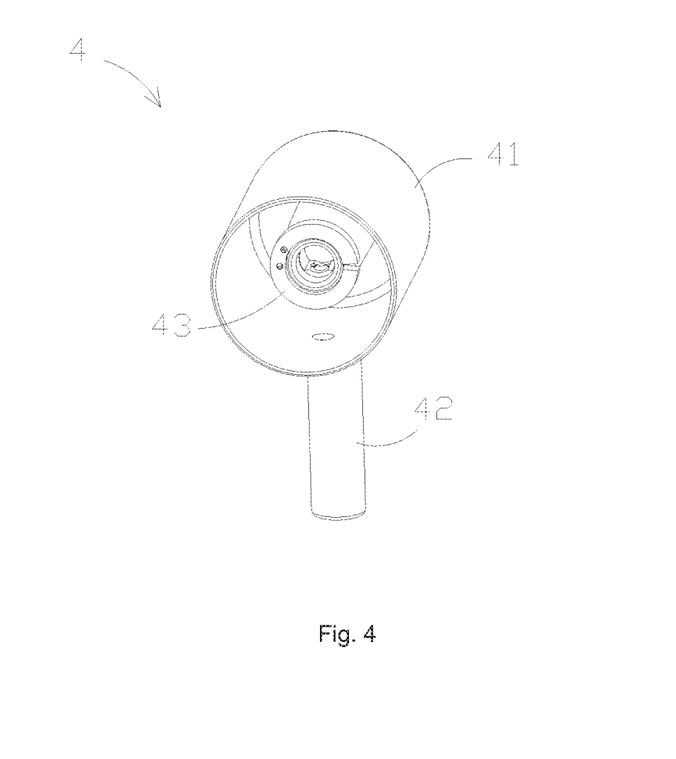
FIG. 4 is a schematic view of the handle according to an embodiment of the invention.

As shown in FIG. 3-FIG. 5, a handle 4 is used to engage with the valve core 22 that passes through the panel assembly 3. The handle 4 includes a body 41 that substantially in form of cylinder and a haft 42 that projects from the body 41. The body 41 includes an outer circumferential wall 412 coupled to the haft 42 and an inner circumferential wall 411 spaced apart from the outer circumferential wall 412. In some specific embodiments, the haft 42 can be omitted. An annular space is formed between the inner circumferential wall 411 and the outer circumferential wall 412, and an inner hole 413 is provided in the inner circumferential wall 411. The valve rod 23 passes through the panel assembly 3 and extends into the inner hole 413 and is secured to the inner circumferential wall 411 by means of a lock screw 5. Preferably, the inner diameter of the outer circumferential wall 412 is larger than the outer diameter of the flange 362 of the second section 36, or larger than the distance between the outer periphery of the claw 363 of the second section 36' and the center of second section 36', such that the body 41 can cover the second section 36, 36' after being assembled to ensure the integrity of the appearance.

The second section 36 at the end face far away from the panel 31 comprises a positioning slot 364, in which the inner circumferential wall 411 of the handle 4 will be disposed for example when sleeved by a spacer 43 with an opening, so as to make sure that the gap between the handle 4 and the panel 31 keeps constant for walls with different mounting depths. In the illustrated embodiment, a slot extending circumferentially is formed at the bottom of the inner circumferential wall 411, and an engaging flange extending circumferentially is formed in the spacer 43, wherein the engaging flange would be engaged with the slot for creating a stable engagement between the spacer 43 and the handle 4, so as to not only ensure the gap between the handle and the panel keeps constant, but also realize that a certain support can be applied to the handle 4 by the panel assembly 3, avoiding deformation or even breakage of the valve stem 23 caused by the only support to the handle 4 by the valve stein 23.

Preferably, the abrasion between the inner circumferential wall 411 and the wall of the positioning slot 364 are avoided because they are spaced apart completely by the spacer 43. This can be achieved by means of, for example, plugging the spacer 42 onto the end of the inner circumferential wall 411 and causing the spacer 43 to (slightly) project in the axial direction out of the inner circumferential wall 411, while making the outer diameter of the spacer 43 larger than that of the inner circumferential wall 411.

Figure 9:
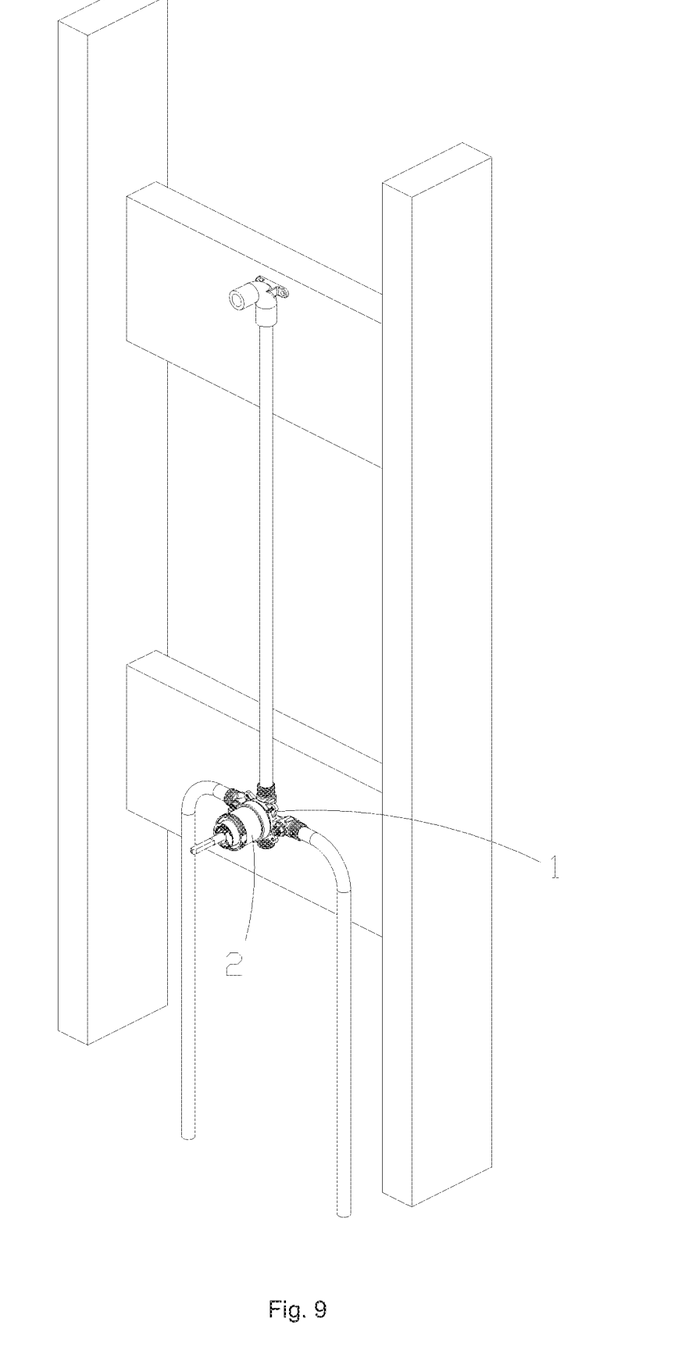
FIGS. 9-12 are schematic views of the procedure of installing the tap device into the wall according to an embodiment of the invention.

FIG. 9 to FIG. 12 illustrate a procedure for installing the tap device. As shown in FIG. 9, the body 1 along with the conduits are mounted into the wall at a certain depth in advance, and then the valve 2 is installed into the body 1.

Figure 10:
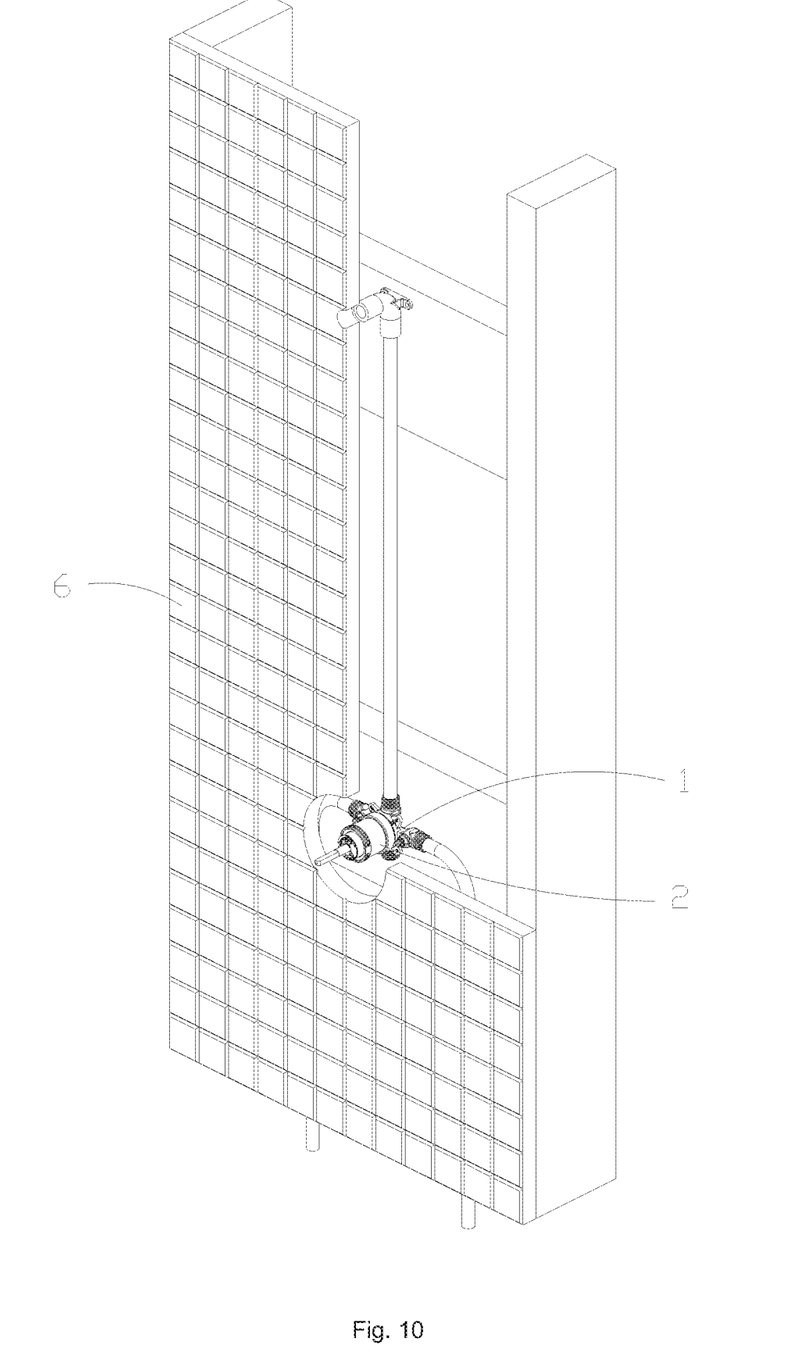

Next, as shown in FIG. 10, the wall surface 6 is paved.

Figure 11:
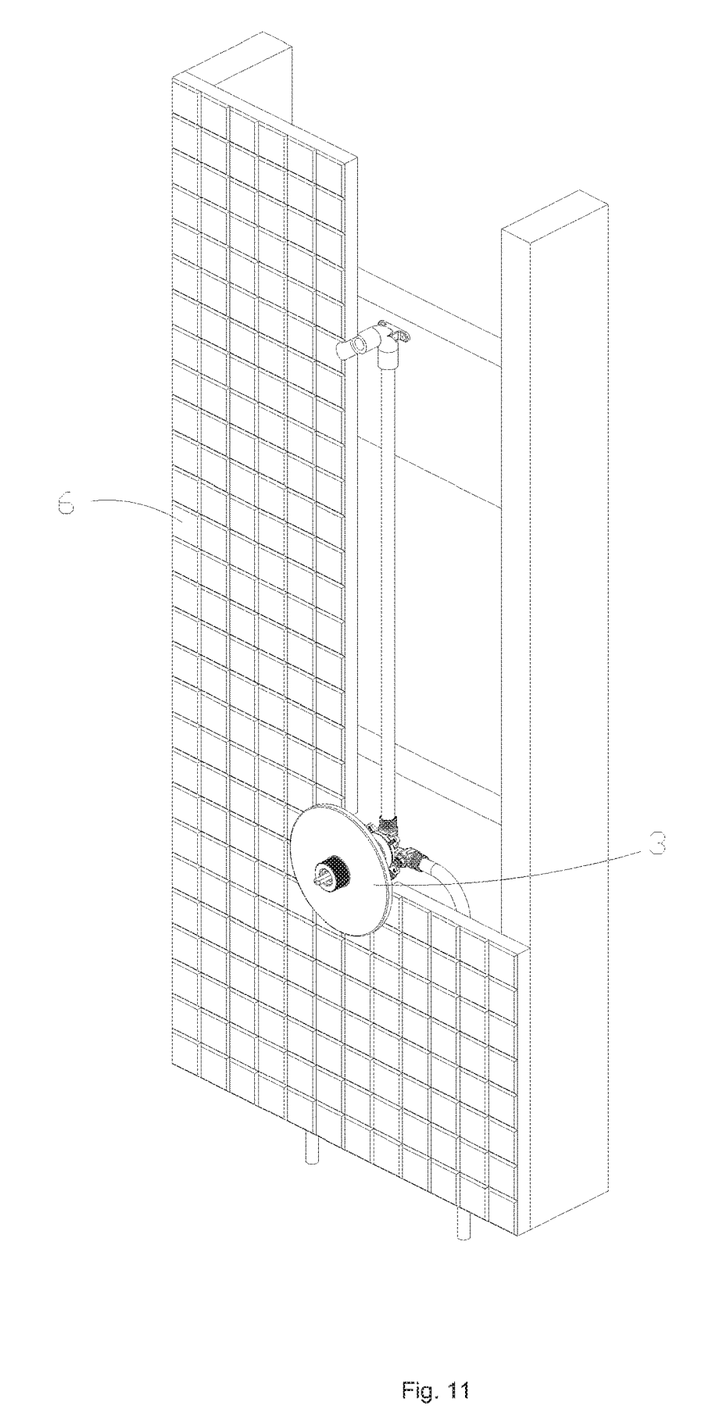

Next, as shown in FIG. 11, the panel assembly 3 assembled is arranged onto the valve 2. Specifically, the first section 34, 34' is screwed onto the valve cover 21 and the axial position of the first section 34, 34' with respect to the valve cover 21 is adjusted according to the depth of the wall until the panel 31 is pressed against the wall surface 6. Preferably, a collar 33 with an opening is provided at the side of the panel 31 facing the wall surface 6.

Figure 12:
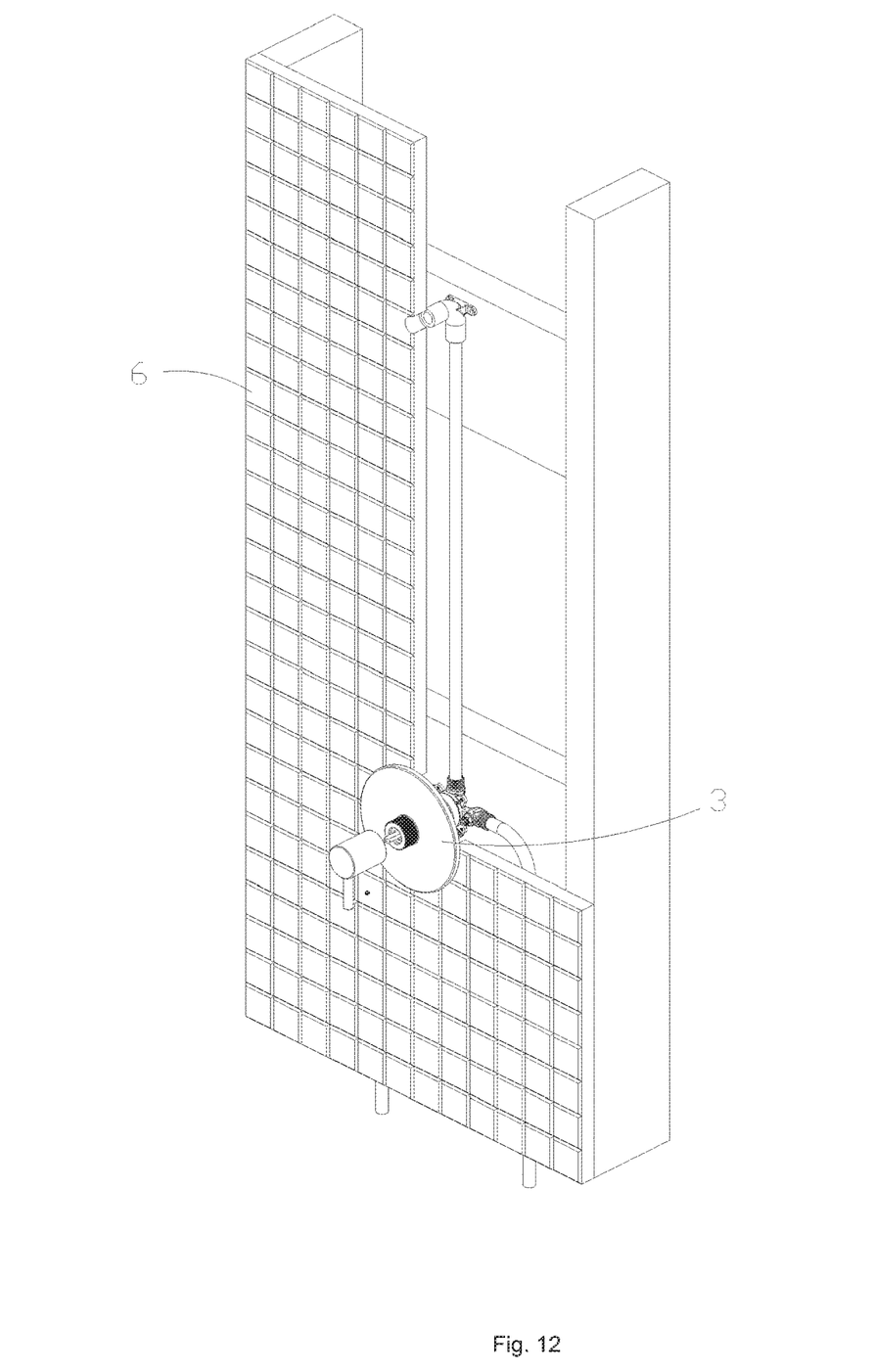

As further shown in FIG. 12, the handle 4 is installed onto the panel assembly 3. Specifically, the inner circumferential wall 411 of the handle 4 together with the spacer 43 are disposed within the positioning slot 364 of the positioning member 32,32', while the valve rod 23 projects into the inner hole 413 surrounded by the inner circumferential wall 411, and the valve rod 23 then is fixed relatively to the inner circumferential wall 411 by means of the lock screw 5.

The invention brings out following advantages:

1. The axial position of the positioning member of the panel assembly can be adjusted with respect to the valve/body that is embedded in the wall, such that the position of the panel can be adapted to the walls with different depths to make sure that the panel is pressed against the wall surface, without worrying about excessively protruding of the panel or the positioning member relatively to the wall surface due to an excessive distance between the panel or the positioning member and body, or being caught in the wall due to insufficient distance between the panel or the positioning member and body.

2. Making use of a positioning member that can be moved flexibly in the axial direction, instead of two screws which are used originally for installing the panel, can eliminate incline, bend and damage of the panel which are possibility caused by the uneven force applied to the two screws.

3. The positioning member is assembled only by means of the center through hole of the panel, and thus the process that creates perforations for the screws on the panel can be omitted.

4. Providing a positioning slot on the positioning member for receiving the handle, which ensures that the gap between the handle and the panel can keep constant for walls with different mounting depths.

5. The abrasion between the handle and the positioning slot is avoided because they are spaced apart completely by the spacer.

6. Disposing the handle into the positioning slot provides a certain support thereto, thereby protecting the valve rod.

7. Disposing the handle together with the spacer with openings into the positioning slot may correct the issues of eccentricity and tilt caused by the accumulated tolerance, such that the user experience will be improved and the abrasion life of elements will be increased.

It should be appreciated that although the specification is described according to the embodiments, not each embodiment only comprises one independent solution, the description manner of the specification is just for clarity, and the skilled in the art should take the specification as a whole, wherein solutions of each embodiment can be combined to propose other solutions that can be appreciated by the skilled in the alt.

What has been described before is just an example of detailed description of the invention and not in any limiting sense. Each equivalent changes, modifications and combinations made by any skilled person in the art should fall within the protection scope of the invention without departing from the spirit and principle of the invention.

The invention claimed is:

1. A panel assembly for a tap device, wherein the tap device includes a valve with a valve cover, the panel assembly including a panel with a through hole, characterized in that the panel assembly further includes a positioning member passing through the through hole and can be secured to the panel, which positioning member is movably plugged onto the valve cover in an axial direction of the valve cover, wherein the positioning member defines a recess in a circumferential direction thereof, in which a periphery of the through hole of the panel is received.

2. The panel assembly of claim 1, wherein the positioning member comprises:

a first section adapted to be plugged onto the valve covers movably, with an outer diameter of the end face thereof being larger than a diameter of the through hole of the panel; and a second section connected to the first section and having a stop face projecting radially, wherein the stop face is spaced apart from the end face of the first section in an axial direction of the first section, and the recess for receiving the panel is defined between the stop face and the end face of the first section.

3. The panel assembly of claim 2, wherein the first section is configured as a sleeve with an internal thread, so as to be adapted to form a threaded connection with the valve cover.

4. The panel assembly of claim 3, wherein the second section is provided with an external thread matched to the internal thread of the first section, such that the first section and the second section are detachable.

5. The panel assembly of claim 4, wherein the second section is provided with a flange extending in a circumferential direction thereof, and an end face of the flange facing the external thread defines the stop face.

6. The panel assembly of claim 2, wherein the first section and the second section are integrally formed, and the second section is arranged along a circumferential direction thereof with a plurality of radially retractable elastic claws, end faces of which elastic claws facing the first section define the stop face.

7. The panel assembly of claim 2, wherein the valve further includes a valve core provided with a valve rod and received in the valve cover, and wherein the tap device further includes a handle adapted to be connected to the valve rod, wherein the end face of the second section of the positioning member facing away from the first section defines a positioning slot adapted to receive the handle.

8. A tap device, comprising:

a body having a mounting slot;

a valve having a valve core received in the mounting slot and provided with a valve rod, as well as a valve cover plugged onto the valve core and connected to the body;

a panel assembly plugged onto the valve cover; and a handle connected to the valve rod on a side of the panel assembly facing away from the body;

wherein the panel assembly is the panel assembly according to claim 1.

9. A tap device, comprising:

a body having a mounting slot;

a valve having a valve core received in the mounting slot and provided with a valve rod, as well as a valve cover plugged onto the valve core and connected to the body;

a panel assembly plugged onto the valve cover; and a handle connected to the valve rod on a side of the panel assembly facing away from the body;

wherein the panel assembly is the panel assembly according to the claim 7, the handle has an inner circumferential wall and an outer circumferential wall radially spaced thereforem, the inner circumferential wall is disposed in the positioning slot and defines an inner hole extending axially, and the valve rod is inserted into the inner hole and connected to the inner circumferential wall.

10. The tap device of claim 9, wherein a spacer is mounted on the inner circumferential wall of the handle and disposed into the positioning slot together with the inner circumferential wall, and the spacer is positioned between the positioning slot and the inner circumferential wall.

\* \* \* \* \*